(12) United States Patent
Ohrt et al.

(10) Patent No.: US 11,474,335 B2
(45) Date of Patent: Oct. 18, 2022

(54) MICROSCOPE OBJECTIVE AND MICROSCOPE HAVING SUCH AN OBJECTIVE

(71) Applicant: Carl Zeiss Microscopy GmbH, Jena (DE)

(72) Inventors: Thomas Ohrt, Golmsdorf (DE); Michael Goegler, Wolfratshausen (DE); Thorsten Kues, Bovenden-Eddigehausen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 271 days.

(21) Appl. No.: 16/640,706

(22) PCT Filed: Aug. 6, 2018

(86) PCT No.: PCT/EP2018/071272
§ 371 (c)(1),
(2) Date: Feb. 20, 2020

(87) PCT Pub. No.: WO2019/038070
PCT Pub. Date: Feb. 28, 2019

(65) Prior Publication Data
US 2020/0355901 A1     Nov. 12, 2020

(30) Foreign Application Priority Data
Aug. 21, 2017   (DE) .......................... 102017119095.3

(51) Int. Cl.
*G02B 21/18*    (2006.01)
*G02B 21/33*    (2006.01)
(Continued)

(52) U.S. Cl.
CPC ............... *G02B 21/33* (2013.01); *G02B 1/18* (2015.01); *G02B 21/0088* (2013.01); *G02B 21/02* (2013.01)

(58) Field of Classification Search
CPC .... G02B 21/0088; G02B 21/02; G02B 21/33; G02B 21/18; G01N 1/28; G11B 7/244; G03F 7/0341; C07F 7/04
See application file for complete search history.

(56) References Cited

U.S. PATENT DOCUMENTS 5,200,152 A    4/1993  Brown
6,555,384 B1   4/2003  Angros
(Continued)

FOREIGN PATENT DOCUMENTS

CN    101578308 A    11/2009
DE    86 24 431.0     1/1987
(Continued)

OTHER PUBLICATIONS

Chinese Search Results for CN 2018800539051, dated Mar. 2, 2021 (1 page).
(Continued)

*Primary Examiner* — Mustak Choudhury
(74) *Attorney, Agent, or Firm* — Christensen, Fonder, Dardi & Herbert PLLC

(57) ABSTRACT

A microscope objective for imaging a specimen using a microscope, the microscope objective being designed as an air objective for microscopy without an immersion medium or as an oil immersion objective for microscopy with an oil-based immersion medium or as a water immersion objective for microscopy with a water-based immersion medium. The front lens of the microscope objective is provided with a coating which repels an immersion medium and is lipophobic and hydrophobic if the objective is an air (Continued)

objective, only lipophobic if the objective is a water immersion objective, and only hydrophobic if the objective is an oil immersion objective.

14 Claims, 2 Drawing Sheets

(51) Int. Cl.
*G02B 1/18* (2015.01)
*G02B 21/00* (2006.01)
*G02B 21/02* (2006.01)

(56) References Cited

U.S. PATENT DOCUMENTS

| | | | |
|---|---|---|---|
| 6,809,794 B1 | 10/2004 | Sewell | |
| 7,961,384 B2 * | 6/2011 | Pirsch | G02B 21/33 359/368 |
| 8,001,857 B2 | 8/2011 | Kahl | |
| 8,465,708 B2 | 6/2013 | Harada et al. | |
| 8,465,709 B2 | 6/2013 | Harada et al. | |
| 2004/0257962 A1 * | 12/2004 | Walker | G11B 7/1374 369/112.01 |
| 2005/0179997 A1 * | 8/2005 | Komatsu | G02B 21/33 359/368 |
| 2006/0264650 A1 | 11/2006 | Arora | |
| 2006/0275918 A1 | 12/2006 | Harada et al. | |
| 2007/0018057 A1 | 1/2007 | Kovac | |
| 2008/0137064 A1 | 6/2008 | Arata et al. | |
| 2009/0281239 A1 | 11/2009 | Hoshino et al. | |
| 2014/0333998 A1 | 11/2014 | Kohli et al. | |
| 2015/0241682 A1 | 8/2015 | Kues et al. | |
| 2015/0361279 A1 | 12/2015 | Foumand | |
| 2017/0199368 A1 | 7/2017 | Goodwin et al. | |
| 2018/0275397 A1 | 9/2018 | Chung et al. | |

FOREIGN PATENT DOCUMENTS

| | | | |
|---|---|---|---|
| DE | 20 2011 005 278 U1 | 11/2012 | |
| EP | 1 679 541 A1 | 7/2006 | |
| EP | 1 717 628 A1 | 11/2006 | |
| EP | 2 256 535 A1 | 12/2010 | |
| JP | 2005-345726 A | 12/2005 | |
| JP | 2009-217049 A | 9/2009 | |
| JP | 4603295 B2 | 12/2010 | |
| WO | WO-2015010783 A1 * | 1/2015 | G02B 21/02 |
| WO | WO 2015/181367 A1 | 12/2015 | |
| WO | WO 2017/099459 A1 | 6/2017 | |

OTHER PUBLICATIONS

Ta, Van Duong, et al., "Laser textured superhydrophobic surfaces and their applications for homogeneous spot deposition," *Applied Surface Science*, vol. 305, pp. 153-159 (2016).

Groten, Jonas, et al., "Light-Induced Switching of Surfaces at Wetting Transitions through Photoisomerization of Polymer Monolayers," *Langmuir*, vol. 28, No. 42, 9 pages (2012).

Guenther, "Light-sheet microscopy," https://sguenther.eu/science/light-sheet-microscopy/, 5 pages.

Lahann, Joerg, et al., "A Reversibly Switching Surface," *Science*, vol. 299, pp. 371-374 (Jan. 17, 2003).

Keller, H. Ernst, "Objective Lenses for Confocal Microscopy," *Handbook of Biological Confocal Microscopy*, Third Edition, pp. 145-161 (2006).

Hell, S., et al., "Aberrations in confocal fluorescence microscopy induced by mismatches in refractive index," *Journal of Microscopy*, vol. 169, Pt. 3, pp. 391-405 (Mar. 1993).

Murphy, Douglas B., "Fundamentals of Light Microscopy and Electronic Lighting," 385 pages (2013).

Nakayama, Masamichi, et al., "Light-sensitive Fluoropolymer Coated Surface for Control of Cell Adhesion Behavior," *Society for Biomaterials Annual Meeting and Exposition*, ISBN: 978-1-5108-0106-6, 4 pages (2015).

Rosario, Rohit, et al., "Lotus Effect Amplifies Light-Induced Contact Angle Switching," *J. Phys. Chem. B.*, vol. 108, No. 34, 3 pages (2004).

Takei, Yoshiyuki G., et al., "Dynamic Contact Angle Measurement of Temperature-Responsive Surface Properties for Poly(N-isopropylacrylamide) Grafted Surfaces," *Macromolecules*, pp. 6163-6166 (1994).

Tkaczyk, Alan H., et al., "Fluidic Switching of High-Speed Air-Liquid Two-Phase Flows Using Electrowetting-On-Dielectric," $7^{th}$ *Int. Conference on Micro Total Analysis Systems, Microtas*, pp. 461-464 (Oct. 5, 2003).

Yao, Lin, et al., "Recent progress in antireflection and self-cleaning technology—From surface engineering to functional surfaces," *Progress in Materials Sciences*, vol. 61, No. 94-143 (2014).

* cited by examiner

MICROSCOPE OBJECTIVE AND MICROSCOPE HAVING SUCH AN OBJECTIVE

PRIORITY CLAIM

The present application is a National Phase entry of PCT Application No. PCT/EP2018/071272, filed Aug. 6, 2018, which claims priority from German Patent Application 10 2017 119 095.3, filed Aug. 21, 2017, the disclosures of which are hereby incorporated by reference herein in their entirety.

FIELD OF THE INVENTION

The invention relates to a microscope objective for imaging a sample using a microscope, wherein the microscope objective is configured as an air objective for microscopy without an immersion medium or as an oil immersion objective for microscopy with an oil-based immersion medium or as a water immersion objective for microscopy with a water-based immersion medium or as a multi-immersion objective for selectively carrying out microscopy without an immersion medium or with an oil-based immersion medium or with a water-based immersion medium. The invention further relates to a microscope comprising such a microscope objective.

BACKGROUND OF THE INVENTION

In microscopy, the use of immersion objectives offers many advantages, which ultimately arise from the higher obtainable apertures of the objectives. An immersion medium with a refractive index that is as high as possible but does not exceed that of the cover slip of the sample maximizes the aperture in microscopy. Different immersion media are used depending on the type of sample, including organic replacement media for water, e.g., Carl Zeiss Immersol W and Immersol G. Generally, the immersion media are liquid at normal temperature. Water-based immersion media are used for microscopy of living cells situated in an aqueous environment. Since the refractive indices of the immersion medium and of the sample medium are very similar in that case but the cover slip has generally a different refractive index, an optical correction is needed to avoid spherical aberrations when looking deeper into the sample. However, a given correction only applies to a certain cover slip thickness and type, which is why water immersion objectives generally have a correction mechanism that, by displacing a lens or lens group in the objective, corrects for deviations from the cover slip thickness and type that had been basis of the given correction.

The prior art has disclosed various approaches for ensuring that a front lens of a microscope objective is wetted as completely as possible with an immersion medium. EP 1717628 A1 and EP 2256535 A1 disclose a mechanism for inverted microscope objectives, i.e., microscope objectives that examine a sample by microscopy from below. A mechanism is provided on the front-side edge of the lens casing, said mechanism preventing a drop of immersion liquid placed on the front lens from running off over the front peripheral edge of the lens casing. Moreover, drainage tubes are provided that directly drain immersion liquid downward. An inner zone of the peripheral edge is configured to repel the immersion liquid for which the microscope is designed. A surrounding outer zone is configured in exactly the opposite way, and so it drains immersion liquid that has reached it to the outside. JP 4603295 refers to further publications and discusses various concepts that prevent a contamination of the objective interior with immersion liquid. Two of the solutions described therein correspond to those of the aforementioned EP documents. A third solution, which is described in the Japanese publication, provides a groove on the objective, said groove preventing excess immersion liquid from running into the objective. Further, for an oil immersion-based microscope, JP 4603295 proposes a lipophilic coating on the lens surface, which is surrounded by a lipophobic coating on the peripheral edge of the lens surface. Thus, in various approaches, this prior art considers how to avoid contamination of an objective with immersion liquid or how to drain excess immersion liquid directly.

SUMMARY OF THE INVENTION

However, a problem arising independently thereof is that the ever greater range of immersion liquids and the greater specialization of the microscope objectives to specific immersion media, which is driven by the desire for a higher resolution, makes it ever more difficult for the user to avoid an incorrect use of the objective with the wrong immersion liquid. Generally, an incorrect use manifests itself in an insufficient imaging quality.

The invention is therefore based on the object of ensuring a consistently high imaging quality in microscopy.

Embodiments of the invention are defined in the independent and dependent claims.

The invention provides for the microscope objective to also be immersion medium-repellent, specifically at its front lens, such that it repels all immersion media for which it is not suitable. In principle, a distinction is made between water-based immersion media and oil-based immersion media. If the microscope objective is designed for immersion medium-free microscopy (so-called air objectives), the front lens is both hydrophobic and lipophobic. A microscope objective that is designed for oil immersion is purely hydrophobic; i.e., it does not repel oil-based substances. A microscope objective designed for water-based microscopy is purely lipophobic; i.e., it does not repel water-based immersion media. As a result of this, a user is not even able to apply an unsuitable immersion medium to the front lens. Said immersion medium always runs off from the front lens. The use of wrong immersion media in microscopy is therefore precluded and a consistently high optical quality is ensured. In particular, what can no longer occur is that customers are annoyed about poor image quality on account of incorrect combination of immersion medium and objective or that an air objective is provided with an oil immersion in a would-be attempt to improve the resolution. This also avoids the need for cleaning that occurs when a water immersion objective has been used with an oil immersion. Moreover, elements on objectives, for example sealing rings etc., are often designed for the correct immersion liquid only and get damaged by a wrong immersion liquid. That is also avoided.

Immersion liquids that are unsuitable for the respective microscope objective necessarily run off. For this purpose, it is preferable to use the coating to produce a drainage channel for repelled immersion medium having applied an immersion-repellent layer, which surrounds the front lens, on a lens mount and a lens casing. This layer leaves a field extending away from the front lens free on the lens mount and lens casing. This field defines a drainage channel. That immersion medium-repellent can be the same as on the front lens of the microscope objective. However, since preferably no immersion medium at all should adhere to the objective mount and objective casing, not even the immersion medium that can be reliably applied to the front lens, the layer is preferably configured to be lipophobic and hydrophobic such that even the permissible immersion medium can run through the drainage channel securely. It is of advantage to provide a receptacle for drained immersion medium at the end of the drainage channel.

In addition to microscope objectives that are specifically designed for microscopy without an immersion medium or with an oil-based or a water-based immersion medium, there are also so-called multi-immersion objectives that can be selectively used without immersion medium or with an oil-based immersion medium or with a water-based immersion medium. Three caps are provided for such microscope objectives. A first cap is provided for microscopy without an immersion medium and it is lipophobic and hydrophobic. A second cap is provided for microscopy with a water-based immersion medium and it is only lipophobic. A third cap is provided for microscopy with an oil-based immersion medium and it is only hydrophobic. Preferably, the caps are only placeable on the microscope objective at a certain angular position and have a drainage channel at the edge that surrounds the front lens. Further, the objective casing is lipophobic and hydrophobic, with a field that extends away from the front lens being recessed. This then acts as a drainage channel for repelled immersion medium and preferably likewise ends in the aforementioned collection receptacle.

The phrase "only hydrophobic" or "only lipophobic" expresses that the respective other type of immersion liquid is not repelled. The repellent properties of the layers are defined via the contact angle at the contact surface. A layer is referred to as repellent in the case of a contact angle of 90° or greater. The terms "hydrophobic" and "lipophobic" comprise repulsion angles of greater than 110°, for example. Such properties are also referred to as superhydrophobic or superlipophobic in the literature. The repellent properties of the corresponding surface can be obtained by way of a surface treatment. The treatment can be a coating, which is preferred and described below by way of example only. However, equally, a structure that produces the repellent properties could be introduced into the corresponding surface or the surface could be treated in another way, e.g., chemically, in order to obtain the desired repellent properties. Coatings that are hydrophobic or lipophobic or a combination of lipophobic and hydrophobic (also called omniphobic) are known on the basis of nanoparticles or nanostructures from the literature. Reference is made as an example to the publication of L. Yoa et al., "Recent progress in antireflection and self-cleaning technology—from surface engineering to functional surfaces", Progress in Materials Science 61, pp. 94-143, 2014. The coatings preferably have a thickness of between 0.1 nm and 50 μm. A typical thickness range covers thicknesses between 5 and 50 nm. Coatings preferably have a transmission of more than 95% in the spectral range of 365-900 nm. The coatings preferably have a self-regenerating property. Damage disappears without external agents as a result of this property, i.e., defects fill-in independently, and so the repellent property regenerates itself at damaged points. Such materials are known; they have mobile elements in solid-state materials, said mobile elements diffusing to the defect, forming a solid connection with the intact material yielding the defect and thereby filling the latter. The coatings are preferably durable in a temperature range from +5 to +70°. The same applies to UV radiation from 300 nm to 450 nm.

A development of the invention provides for the microscope objective itself and components of the microscope, e.g., objectives, controllers, buttons, interfaces to other modules or structures, to also be sealed off against liquids. In particular, an interface between a microscope objective and stand has a lipophobic and hydrophobic (i.e., omniphobic) embodiment at the opposite surfaces in this case. This prevents immersion liquids, but also embedding media, nutrient solution, buffers, etc., from penetrating into an interface between stand and microscope objective and being drawn in by capillary effect.

A wrong immersion is repelled and cannot remain on the objective. The drainage direction and the liquid flow are clearly specified by the optionally provided drainage channels and preferably run in directed fashion to a receptacle, where said liquid is then disposed of. To this end, an inclination of the objective in the microscope can be used to support the directed discharge through the drainage channel. Thus, the invention not only prevents the use of a wrong immersion liquid, but also ensures a definite disposal, which is advantageous in the case of irritating or toxic immersion liquids, in particular, without the user having to intervene. Moreover, the stand is then protected from liquids and the associated damage potential. In a development, a liquid sensor is provided in the drainage channel, said liquid sensor detecting the drainage of a (possibly wrong) immersion liquid and initiating additional cleaning of the objective. Said initiation can be implemented by displaying a cleaning signal that prompts a user to carry out cleaning, or by automatically carrying out a cleaning process. In particular, such a cleaning process can comprise the application of an air stream to the objective, the rotation of the objective turret, etc. This ensures that surely no residues remain on the microscope objective after an incorrect use.

A further advantage of the repellent microscope objective lies in the prevention of the introduction of immersion liquid and sample liquid (nutrient medium, buffer, embedding media) into the interior of objectives and stands. To this end, an interface between objective and stand can be repellent in one embodiment. In another embodiment, the lipophobic and hydrophobic characteristic is also formed at a joint, e.g. joint 24 at rotating rings, of the microscope objective and/or lens mount 22 of the microscope objective in order to prevent a contamination of the optical elements of the microscope. This is particularly advantageous when objectives are inserted into a liquid-filled chamber. Elaborate sealing rings can then be dispensed with.

It goes without saying that the features mentioned above and those yet to be explained below can be used not only in the combinations specified but also in other combinations or on their own, without departing from the scope of the present invention.

BRIEF DESCRIPTION OF THE DRAWINGS

The invention will be explained in even more detail below on the basis of exemplary embodiments, with reference being made to the attached drawings, which likewise disclose features essential to the invention. These exemplary embodiments serve merely for elucidation and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and variations which are described for one of the exemplary embodiments may also be applicable to other exemplary embodiments. In order to avoid repetition, the same elements or corresponding elements in different figures are denoted by the same reference signs and are not explained a number of times. In the figures.

DETAILED DESCRIPTION

Figure 1:
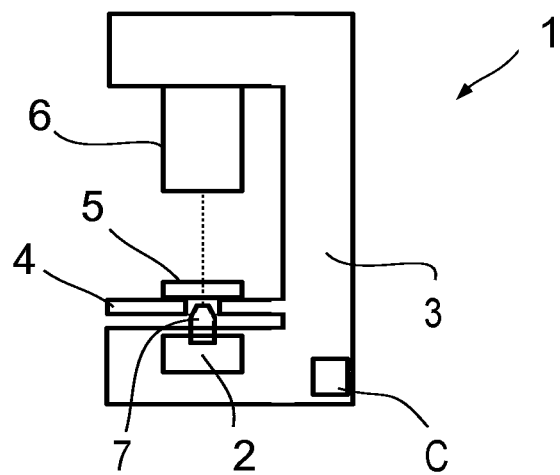
FIG. 1 shows a schematic illustration of an inverted microscope.

FIG. 1 schematically shows a microscope 1 which comprises a objective turret 2 in a base of a stand 3. Further, a sample stage 4, on which a sample 5 is located, is provided at the stand 3. An illumination device 6 illuminates the sample 5 from above; an objective 7 held in the objective turret 2 images the illuminated sample 5.

Figure 2:
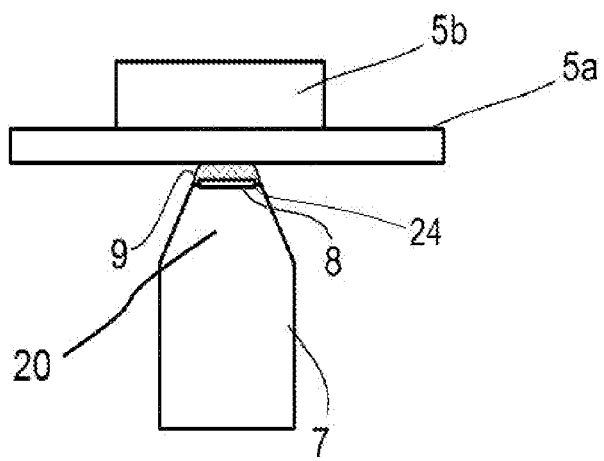
FIG. 2 shows an enlarged detail of the illustration in FIG. 1.

FIG. 2 shows an enlarged view of the relationship between the objective 7 and the sample 5, which consists of a sample carrier 5a with the sample substance 5b lying thereon.

The objective 7 comprises a front lens 8, an immersion liquid 9 being applied thereto depending on the configuration of the objective 7. The objective 7 is designed for a specific immersion liquid. There are also cases in which the objective 7 needs to be used without immersion. Then, the immersion liquid 9 is dispensed with and must not be applied.

In order to prevent incorrect operation by the user, the front lens 8 of the objective 7 is provided with a coating 10 which repels an immersion liquid for which the objective 7 is not designed. The coating is omniphobic in the case of an air objective. It is hydrophobic in the case of an oil immersion objective; it is lipophobic in the case of a water immersion objective. An air objective 7 is shown as an embodiment in FIG. 3; the coating is omniphobic. This is visualized by cross hatching. In the illustrated embodiment, the coating extends not only over the front lens 8, but also downward along the lens casing 20. This is optional. Further, the coating optionally leaves a drainage channel 11 free, where the casing 20 and the peripheral edge of the front side of the microscope objective are not coated. On account of this lack of coating, an erroneously applied immersion liquid, which is repelled by the coating 10, runs downward through the drainage channel 11. The drainage channel 11 ends in a receptacle 12 which receives the unwanted liquid.

Figure 3:
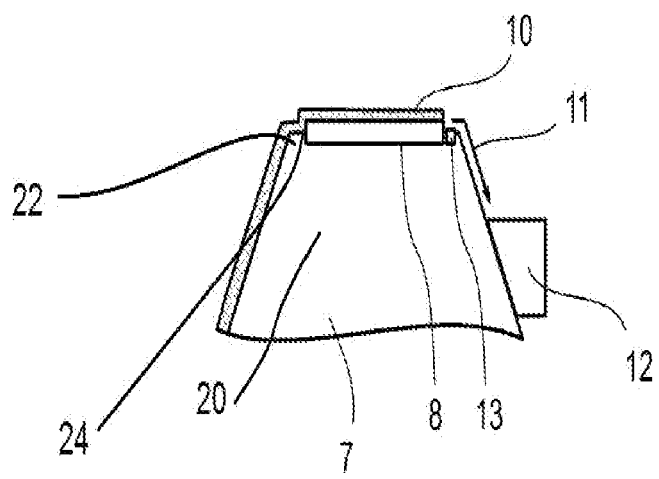
FIG. 3 shows the top side of an objective of the microscope of FIG. 1.

FIG. 3 depicts an optional immersion liquid sensor 13, which detects whether immersion liquid was drained through the drainage channel 11. It is sufficient for the sensor 13 to respond to the existence of any immersion liquid in the case of an air objective. It supplies a corresponding signal to a controller, for example a controller C in the microscope 1. This is followed by an indication that the lens needs to be cleaned or an automatic cleaning process is initiated. This can comprise blowing compressed or pivoting the objective into a specific position by rotating the objective turret 2. Automatic cleaning processes are known to a person skilled in the art. Such automatic cleaning processes can be used as soon as the sensor 13 detects that immersion liquid has been used on the air objective 7. If the objective 7 is an immersion objective, the sensor 13 is embodied to detect the type of immersion liquid. If it detects an immersion liquid that was unsuitable for the objective 7, said sensor likewise initiates the measures already described.

Figure 4:
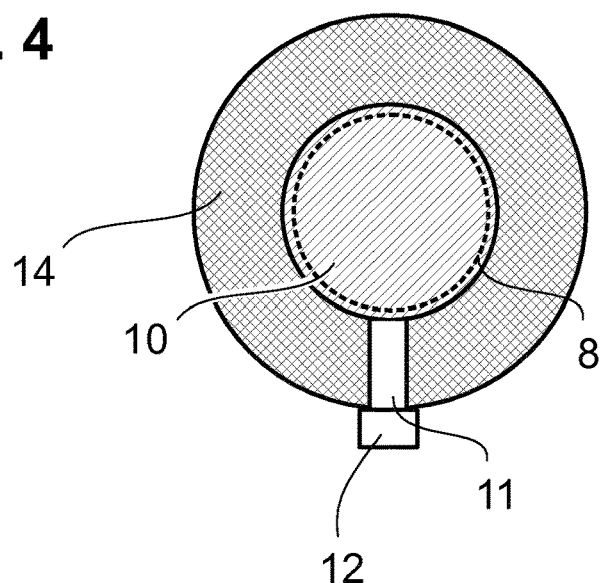
FIG. 4 shows a plan view of the objective.

FIG. 4 shows a plan view of the front side of the objective, in this case an oil immersion objective. The coating 10 covers the front lens 8, which is only shown by dashed lines. It is hydrophobic, which is visualized by oblique hatching from bottom left to top right. By contrast, the peripheral edge of the lens casing 20 is provided with a layer 14. As a result of this, neither a wrong immersion liquid, which is repelled by the coating 10, nor the oil-based immersion liquid, which would be permissible in this case, can cover the surface with the layer 14. By contrast, the drainage channel 11 is not coated at all, and so both correct and incorrect immersion liquid can flow through the drainage channel 11 to the receptacle 12.

Figure 5:
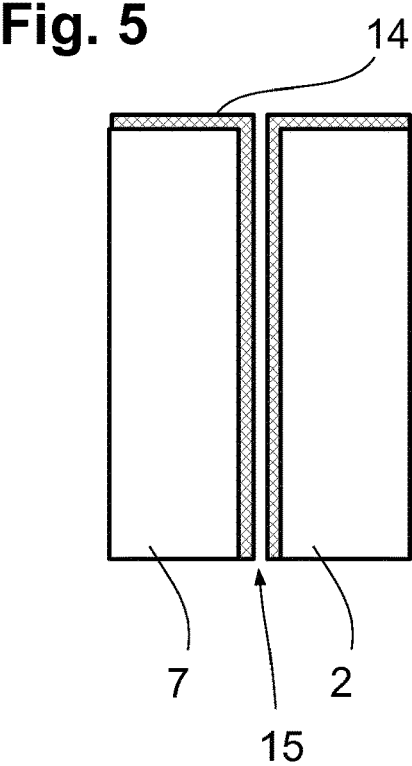
FIG. 5 shows an interface between the microscope of FIG. 3 and the stand of the microscope of FIG. 1.

FIG. 5 schematically shows an interface 14 between the objective turret 2 and the objective 7. The interface 15 is, for example, a threaded or a bayonet-type connector. It is likewise provided with the omniphobic layer 14 on both sides. An omniphobic layer is advantageous in that no immersion liquid can be drawn into the interface 15 by capillary forces. Thus, in particular, an immersion liquid that is actually permitted for the objective is not drawn in either. In general, the interface can lie between parts of the stand, between parts of the objective, between objective and stand, between attachments and stand, between objective and attachments and/or between sample chamber/sample carrier and objective.

Figure 6:
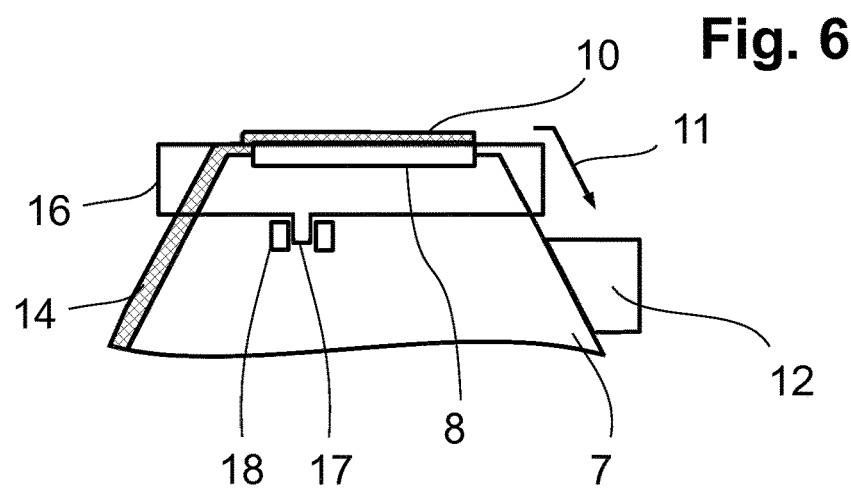
FIG. 6 shows an alternative configuration of the objective.

FIG. 6 shows a configuration in the case of a multi-immersion objective, which can be used with different type of immersions depending on the requirements. Here, a cap 16 is provided, which comprises the coating 10 and is disposed over the front lens 8. Regarding the coating 10, the cap 16 is designed for a specific immersion type. In the illustrated exemplary embodiment, said cap is designed for microscopy without immersion liquid, as can be seen from the cross-hatching. In the case of oil or water immersion microscopy, the cap would be provided with a hydrophobic or a lipophobic coating 10, respectively. The edge of the objective, i.e. the jacket or the lens casing 20, is provided with the omniphobic layer 14, which again leaves the drainage channel 11 to the receptacle 12 free. The omniphobic coating is necessary because three types of cap 16 are provided for the microscope objective 7. A first cap 16 has, as illustrated, an omniphobic coating and serves for the use of the microscope objective as an air objective. A second cap has a lipophobic coating and serves for the use as a water immersion objective. A third cap has a hydrophobic coating and serves when the multi-immersion objective is used as an oil immersion objective.

In an configuration with drainage channel 11, which is generally optional, the cap 16 is equipped with a mechanism, e.g., a lug 17, which together with a corresponding counterpart 18 on the jacket of the objective 7 ensures that the cap 16 is placed in a certain rotational position such that the field, which is not provided with the layer 14 on the microscope objective jacket, is in the continuation of the field where the cap is not provided with the coating 10. The drainage channel is therefore continuous. Depending on the configuration of the edge coating of the cap, this feature can be dispensed with.

The invention claimed is:

1. A microscope objective for imaging a sample using a microscope, wherein the microscope objective comprises a front lens having a coating, wherein one of the following three combinations applies:

the microscope objective is configured as an air objective for microscopy without an immersion medium located between the front lens and the sample, and the coating is on the front lens of the microscope objective and is lipophobic and hydrophobic, the microscope objective is configured as an oil immersion objective for microscopy with an oil-based immersion medium located between the front lens and the sample, and the coating is on the front lens of the microscope objective and is purely hydrophobic, and the microscope objective is configured as a water immersion objective for microscopy with a water-based immersion medium located between the front lens and the sample, and the coating is on the front lens of the microscope objective and is purely lipophobic.

2. The microscope objective as claimed in claim 1, further comprising a lens mount and a lens casing, wherein at least one of the lens mount and the lens casing also comprises either the coating or a layer which is lipophobic.

3. The microscope objective as claimed in claim 1, further comprising a lens mount and a lens casing, wherein the lens mount and the lens casing also each comprise the coating with an area free of the coating that extends away from the front lens and acts as a drainage channel for repelled immersion medium.

4. The microscope objective as claimed in claim 1, further comprising a lens mount and a lens casing, wherein the lens mount and the lens casing each comprise a layer which is lipophobic and hydrophobic with an area free of the layer that extends away from the front lens and acts as a drainage channel for repelled immersion medium.

5. The microscope objective as claimed in claim 1, further comprising a receptacle for drained immersion medium.

6. The microscope objective as claimed in claim 5, wherein the microscope objective further comprises a lens mount and a lens casing, each of the lens mount and the lens casing including an immersion medium-repellent layer, said layer configured to repel the immersion medium for which the microscope objective is configured, and the layer surrounds the front lens, and on the lens mount and the lens casing defines an area free of the immersion-medium repellent, the area extending away from the front lens and acting as a drainage channel for repelled immersion medium, wherein the drainage channel ends at the receptacle.

7. The microscope objective as claimed in claim 1, wherein a joint of the microscope objective and/or lens mount of the microscope objective are/is lipophobic and hydrophobic.

8. A microscope comprising a microscope objective as claimed in claim 1.

9. The microscope as claimed in claim 8, wherein a connection point between the microscope objective and an objective holder is lipophobic and hydrophobic.

10. A microscope objective for imaging a sample using a microscope, wherein the microscope objective is configured as a multi-immersion objective for selectively carrying out microscopy without an immersion medium located between the front lens and the sample, or with an oil-based immersion medium located between the front lens and a cover slip of the sample, or with a water-based immersion medium located between the front lens and a cover slip of the sample, wherein the microscope objective also comprises a first cap provided for microscopy without an immersion medium, a second cap provided for microscopy with the water-based immersion medium and a third cap provided for microscopy with the oil-based immersion medium, the first cap, the second cap, and the third cap are each placeable over the front lens and are immersion medium-repellent, and wherein the first cap is lipophobic and hydrophobic, the second cap is only lipophobic and the third cap is only hydrophobic.

11. The microscope objective as claimed in claim 10, wherein the first cap, the second cap, and the third cap are only placeable on the microscope objective at a predetermined angular position, and the microscope objective includes a lens casing that is lipophobic and hydrophobic.

12. The microscope objective as claimed in claim 11, wherein a field that extends away from the front lens is not immersion-repellent and acts as a drainage channel for repelled immersion medium.

13. The microscope objective as claimed in claim 10, comprising a receptacle for drained immersion medium.

14. The microscope objective as claimed in claim 13, wherein the microscope objective further comprises a lens mount and a lens casing, each of the lens mount and the lens casing including an immersion medium-repellent layer, said layer configured to repel the immersion medium for which the microscope objective is designed, and the layer surrounds the front lens, and on the lens mount and the lens casing defines an area free of the immersion-medium repellent, the area extending away from the front lens and acting as a drainage channel for repelled immersion medium, wherein the drainage channel ends at the receptacle.

* * * * *